United States Patent Office 3,074,852
Patented Jan. 22, 1963

3,074,852
PHARMACEUTICALS WITH DELAYED RELEASE
David Mayron, Norristown, Pa., assignor to American Home Products Corporation, New York, N.Y., a corporation of Delaware
No Drawing. Filed June 6, 1960, Ser. No. 33,896
8 Claims. (Cl. 167—82)

This invention relates to therapeutic compositions with delayed release action including the ability to release medication gradually over a relatively long period of time, and methods for preparing them.

Various procedures have been proposed for delaying or prolonging the release of medicaments in oral form but such proposals have not resulted in completely satisfactory products either from the standpoint of simplicity of manufacture or actual ability to achieve the desired smoothly sustained release of the drug.

Early attempts to achieve delayed release of medication involved the formation of a coating over a core of the active drug using an acid-resistant substance such as shellac. The difficulty with this type of oral medication was that if the coating was too thin it broke down in the stomach, releasing the medication too soon and if it was too thick the tablet was excreted practically intact. Furthermore, as is the case with all enteric-coated tablets, even if the coating is carefully adjusted to dissolve or break down in the bowel, all of the drug is immediately released, resulting in a peak action with no further action thereafter. A typical enteric coating material is shellac and a further difficulty develops when this material is used. When a freshly produced tablet having a shellac coating is prepared, its ability to resist stomach acids is satisfactory but this characteristic changes if the tablet is held on the shelf for a considerable period of time before use. In time the coating hardens to such an extent as to prevent even partial absorption of the drug in the intestinal tract, the tablet thus passing through the body substantially intact.

Where it is desirable to avoid sudden full action of the drug or the equivalent thereof, the art has developed procedures involving coating drug granules with varying thicknesses of hydrophobic or non-polar material and commingled granules of different coating thicknesses so that the thinly coated particles release drug earlier than the heavier coated particles. Other procedures involve the use of resins which either seek to achieve a slow leaching action or by the use of an ionic-exchange resin, chemically bind or complex with the drug and then release it by an ionic exchange with the digestive juices of the intestinal tract. These procedures are quite costly because of the amount of labor involved in preparing the compositions and because of the cost of the special resins. Moreover, in the case of the ionic-exchange resins, a sustained release effect is not always obtained.

An object of the present invention is to produce a medicinal composition having delayed or prolonged release characteristics.

A further object of the invention is to produce a medicinal composition capable of releasing drug substantially uniformly over a prolonged period of time.

Another object of the present invention is to provide a pharmaceutical composition which is capable of releasing drug immediately and then uniformly and gradually over a relatively long period of time.

A still further object of the invention is the economical preparation of a medicinal composition having the property of providing delayed or prolonged medication over a selected period of time.

Other objects and advantages will become evident hereinafter.

In accordance with the invention, a solid medicinal component is combined with a special polymeric carrier material that is substantially insoluble in water. The polymeric carrier that is used is the acid form of a polymer prepared as described in United States Patent No. 2,798,053, granted July 2, 1957, selectively utilizing from about 0.75 to 2% by weight of polyalkenyl polyether, for example, polyallyl sucrose as the crosslinking material, the remainder being essentially acrylic acid or its equivalent and the polymerization being carried out in a hydrocarbon diluent with a free radical catalyst, for example, benzoyl peroxide. The carboxy vinyl polymer is more specifically described in United States Patent No. 2,909,462, of particular interest being the preparation produced in acid form. The polymer particularly preferred is that referred to in said latter patent as "Carbopol 934" under which commercial name this acid polymer is sold by B. F. Goodrich Chemical Company. Of interest is the fact that Carbopol 934 is not water soluble as that term is defined in Hackh's Chemical Dictionary, 3rd ed. (1946), although it is stated to be water soluble in the brochure entitled "Carbopol 934," copyrighted in 1957 by the company offering it for sale.

Desirably, an agent capable of preventing the rapid release of a drug should be one which does not readily hydrate or dissolve in an aqueous acid environment as is found in stomach juices. To achieve sustained and uniform release of drug it is desirable that the agent should hydrate or slowly dissolve in the intestinal tract and therefore in that environment where mildly alkaline conditions may be found. It has been discovered that the acid form of the carboxy vinyl polymers coming first in contact with the aqueous acid contents of the stomach does not dissolve or hydrate to any appreciable extent but when it enters the alkaline area of the intestinal tract, the polymer is neutralized, hydrates and becomes water soluble. Actually as a result of the neutralization a gel sheath forms around the tablet which has the effect of reducing the rate of release of the drug.

It may be seen that a water-soluble polymer would be quite ineffective for the purpose desired, namely, to produce a sustained release oral medication. Water solubility of the carrier agent would permit rapid disintegration of the tablet in the stomach with very early release of substantially all of the medication. This is contrary to the desired action which contemplates not more than a small amount of medication being released in the stomach with the greater amount being released in the intestinal tract.

To achieve the desired results a substantially water-insoluble carboxy vinyl polymer as described above is intimately combined with ingredients which neither decompose, disintegrate nor chemically combine with the polymer. The latter is specifically avoided by dry mixing the ingredients and, where possible, by using relatively neutral salts of the desired medicinal.

The drug that is to be combined with the carboxy vinyl polymer may be any medicament where a delayed or sustained release effect is desired and which fulfills the criteria mentioned previously. It should preferably be an acid or a salt which does not change the pH of material portions of the carboxy polymer or of the tablet itself. This means that if a drug to be utilized in the composition is basic in reaction, it should be used as a salt, and preferably as a neutral salt as mentioned previously. This would exclude strongly alkaline salts such as alkali metal and alkaline earth metal carbonates or bicarbonates but would permit the use of relatively mildly basic compounds, for example sympathomimetic amines or phenothiazine compounds, preferably as salts. Among the medicinals contemplated as being usefully employed for sustained release may be mentioned analgesics, antispasmodics, hypotensive agents, sympathomimetics, muscle relaxants, ataractics, antibiotics, anticonvulsants, antihistamines, coronary and peripheral vasodilators, fungistatic agents, antinauseants, central stimulants, parasympathetic inhibitors, and antipruritics, to name the most obvious and important therapeutic classes where a prolonged or delayed release action is desirable.

The compositions of the invention are utilized in the form of tablets which are prepared either in the form of coated or uncoated tablets, preferably the latter.

Sustained release tablets are prepared by first intimately mixing the selected drug and carboxy vinyl polymer in the dry state. Sufficient polymer is used to provide for a sustained release of the drug over a period of at least 5 hours and preferably over a period of about 12 to 14 hours. In general, when a relatively water-insoluble drug is used or when the drug dosage is in the neighborhood of about 200 mg., the ratio of polymer to drug should be about 1:1 on a weight basis. Where large amounts of drug are required, substantially above 200 mg., for example, a ratio of less than 1:1 is utilized, to as low as about 0.5:1, polymer to drug. On the other hand, if the drug is relatively water soluble or if the dosage contemplated is below about 10 mg., the ratio of polymer to drug would be substantially greater than 1:1, for example, going as high as about 100:1. In any case, the total weight of the tablet should not be substantially greater than about 1,000 mg. It will be understood therefore that even with large amounts of a drug, one obtains the desired sustained release effect of the polymer with as little as about 0.5:1, polymer to drug. Within the limits given the ratio of polymer to drug may be changed somewhat to produce a change in the rate of release where this is desired.

In the preparation of uncoated tablets the contemplated drug in the desired dosage amount is intimately mixed with the carboxy vinyl polymer and tabletting lubricant, as for example magnesium stearate, talc or like material. Well known excipients and/or binders may also be added if desired. The mixture is then subjected to a slugging operation, the slugs are crushed and the particles are forced through a sieve of about No. 10 to 30 size.

The particles of intimately mixed drug or drugs and carboxy vinyl polymer are now mixed with additional lubricant and the dry mix is tabletted in a typical tabletting machine to form tablets containing a very small amount of the drug or drugs on the surface with the remainder intimately and uniformly dispersed throughout the tablet.

When it is desired to start the uniform release of drug only after the tablet composition has entered the intestinal tract, the uncoated tablet as produced above may be coated with acid carboxy vinyl polymer by itself. Thus, the sieved particles obtained as previously described are formed into a core by a tablet-forming machine and a coating is prepared by mixing carboxy vinyl polymer with about 0.5% by weight of lubricant. The coating mixture is slugged, granulated and passed through a sieve of the size indicated above. More lubricant (about 0.5%) is added and using a machine that applies a coating onto a core, the coating mixture is applied to the core as previously prepared.

When an enteric coated tablet is desired which has good shelf life and which will provide a substantial drug action only after the medication has entered the intestinal tract, the selected drug is combined with one or more excipients such as lactose or calcium carbonate. This mixture is then granulated and forced through a sieve of a size within the range previously indicated. The particles are combined with a lubricant, for example talc or magnesium stearate. The mixture is then compressed to form a core which is then coated with a carboxy vinyl polymer coating in the manner previously described.

The following examples, while not intended to be limiting, further illustrate the invention previously described.

*Example 1*

50 g. of mephentermine sulphate powder are mixed with 445 g. of Carbopol 934 powder and 2.5 g. of magnesium stearate. The powder mixture is compressed into tablets which are then crushed and the particles forced through a No. 20 sieve. To the granules thus obtained are added 2.5 g. of magnesium stearate and the mixture is then compressed into tablets weighing approximately 500 mg. with a diameter of about ½ inch in size. When tested on a Strong-Cobb hardness tester, the tablets had a hardness of 22 kg.

*Example 2*

Sustained release mephentermine tablets were prepared by the procedure described in Example 1 but varying the polymers and the amounts per tablet. The ingredients per tablet were as follows:

| | Mg. |
|---|---|
| Mephentermine sulphate powder | 5.00 |
| Carbopol 940 | 44.50 |
| Mg. stearate | 0.50 |
| Mephentermine sulphate powder | 5.00 |
| Carbopol 941 | 44.50 |
| Mg. stearate | 0.50 |

*Example 3*

Sustained release promazine tablets were prepared by the procedure described in Example 1 utilizing the following ingredients and amounts per tablet:

| | Mg. |
|---|---|
| Promazine hydrochloride powder | 100 |
| Carbopol 934 powder | 395 |
| Magnesium stearate, USP | 5 |

*Example 4*

Sustained release aspirin tablets were prepared by the procedure disclosed in Example 1 utilizing the following ingredients and amounts per tablet:

| | Mg. |
|---|---|
| Crystalline acetylsalicylic acid (40 mesh USP) | 324 |
| Carbopol 934 powder | 129.6 |
| Magnesium stearate USP | 3.2 |

The tablets so prepared had a diameter of approximately 7/16 inch and a hardness of 25 kg.

*Example 5*

Sustained release penicillin tablets were prepared by the procedure disclosed in Example 1 utilizing the following ingredients and amounts per tablet:

| | Mg. |
|---|---|
| Potassium phenoxymethyl penicillin (420,000 units) | 275 |
| Carbopol 934 powder | 245 |
| Magnesium stearate, USP | 7.5 |

*Example 6*

Prolonged release analgesic tablets containing ergotamine were prepared in accordance with the procedure of Example 1 producing analgesic tablets containing 3 mg. of ergotamine tartrate, 347 mg. of Carbopol 934 powder, and 5 mg. of magnesium stearate USP per tablet.

*Example 7*

To prepare an enteric-coated analgesic medication, a core granulation was made up with the following ingredients and amounts:

| | | |
|---|---|---|
| Sodium Salicylate, USP | g | 325 |
| Lactose, USP | g | 65 |
| Gelatin, USP | | Q.s. |
| Starch, USP | g | 15.6 |
| Talc, USP | g | 15.6 |

A wet granulation was prepared from the sodium salicylate and lactose with the gelatin solution. The wet granulation was forced through a No. 14 sieve and the granules were allowed to dry. The dried granules were then mixed with the starch and talc and this mixture was then compressed to form the core of the tablets.

A coating formulation was made up using 100 g. of Carbopol 934 powder and 0.5 g. of magnesium stearate USP. The mixture was compressed into slugs which were then granulated and passed through a No. 20 sieve. To the granules as formed was added 0.5 part by weight of magnesium stearate and, using a machine that applies a coating onto a core, the coating granulation was compressed as a coating on the original core preparation. By using a flat beveled punch of $^{11}/_{32}$ inch size a core for a tablet weighing approximately 388 mg. was obtained and by using a flat beveled punch of $^{7}/_{16}$ inch size a coating for the tablet weighing 280 mg. was obtained.

*Example 8*

A combined sustained release and enteric-coated tablet was prepared by first forming sustained release cores containing both medication and carboxy vinyl polymer and coating it with the latter. The material for the core was aminophylline utilizing 150 grams which was intimately mixed with 75 grams of Carbopol 934 and 1.25 g. of magnesium stearate. The powder mixture was formed into tablets or slugs, then crushed and passed through a No. 20 sieve. The granules were mixed with 1.25 g. of magnesium stearate and were compressed and formed into cores weighing approximately 380 mg. containing about 250 mg. of aminophylline using an elongated, capsule-shaped punch. A coating of Carbopol 934 was compressed onto the cores in the manner previously described to give a coating of 240 mg. per core.

I claim:

1. A sustained release medicament in tablet form having as its essential active ingredients for sustained release, an intimate and substantially uniform admixture of a drug having substantially neutral to acid characteristics in an aqueous medium and a water-insoluble, unsteamed, acid carboxy vinyl polymer of acrylic acid copolymerized with about 0.75 to about 2% by weight of polyallyl sucrose in a weight ratio of polymer to drug from about 0.5:1 to about 100:1.

2. The composition of claim 1, wherein said tablet is encased in an enteric coating consisting essentially of said carboxy vinyl polymer.

3. An oral medicant in tablet form consisting of a core comprising a drug combined with an excipient and a coating completely covering said core consisting essentially of a water-insoluble, unsteamed, acid carboxy vinyl polymer of acrylic acid copolymerized with about 0.75 to about 2% by weight of polyallyl sucrose, the weight ratio of polymer to drug falling within the range of about 0.5:1 to about 100:1.

4. A process for making sustained action pharmaceutical tablets comprising intimately mixing as the only essentially active ingredients necessary to achieve a sustained action, a powdered drug having substantially neutral to acid characteristics in an aqueous medium with a water-insoluble, unsteamed, acid carboxy vinyl polymer of acrylic acid copolymerized with about 0.75 to 2% of polyalkenyl polyether in a weight ratio of polymer to drug from about 0.5:1 to about 100:1, and then compressing the intimately mixed ingredients to form tablets for oral medication.

5. The process of claim 4; wherein the polyalkenyl polyether is polyallyl sucrose.

6. A process for making pharmaceutical preparations in tablet form for oral use effective for releasing drug essentially only in the intestinal tract comprising mixing a powdered drug with excipient material, compressing said mixture to form a core and coating said core with a coating material consisting essentially of a water-insoluble, unsteamed, acid carboxy vinyl polymer of acrylic acid copolymerized with about 0.75 to 2% of polyalkenyl polyether, the weight ratio of polymer to drug being in the range from about 0.5:1 to about 100:1.

7. The method of obtaining the sustained release of an orally effective drug in the gastrointestinal tract comprising administering to a vertebrate host subject a tablet of a powdered, orally effective drug in an amount sufficient to give a pharmacologic response upon ingestion and absorption, said drug being intimately mixed with a substantially water-insoluble, unsteamed, acid carboxy vinyl polymer of acrylic acid cross-linked with about 0.75 to about 2% by weight of polyalkenyl polyether in a weight ratio of polymer to drug from about 0.5:1 to about 100:1, said admixture being then subjected to sufficient pressure to form a medicinal tablet.

8. The method of claim 7; wherein the cross-linking material is polyallyl sucrose.

References Cited in the file of this patent

UNITED STATES PATENTS

| | | |
|---|---|---|
| 2,798,053 | Brown | July 2, 1957 |
| 2,854,381 | Kuna | Sept. 30, 1958 |
| 2,887,436 | Klioze et al. | May 19, 1959 |
| 2,887,437 | Klioze et al. | May 19, 1959 |
| 2,887,439 | Klioze et al. | May 19, 1959 |
| 2,909,462 | Warfield et al. | Oct. 20, 1959 |
| 2,912,358 | Staib | Nov. 10, 1959 |
| 2,918,411 | Hill | Dec. 22, 1959 |
| 2,957,804 | Shuyler | Oct. 25, 1960 |
| 2,963,453 | Hwa et al. | Dec. 6, 1960 |
| 2,980,655 | Glass et al. | Apr. 18, 1961 |
| 2,987,445 | Levesque | June 6, 1961 |
| 2,991,226 | Millar et al. | July 4, 1961 |
| 3,033,754 | Krahnke et al. | May 8, 1962 |

FOREIGN PATENTS

| | | |
|---|---|---|
| 217,287 | Australia | Sept. 16, 1958 |

OTHER REFERENCES

Carbopol Polymers as Suspending Agents, Suppl. No. 7, February 1960, to Carbopol 934 Bulletin, B. F. Goodrich Co., Cleveland, Ohio (8 pp.).